Aug. 29, 1950 L. N. BRUTUS 2,520,121
LOCK SCREW OR THE LIKE
Filed June 27, 1947
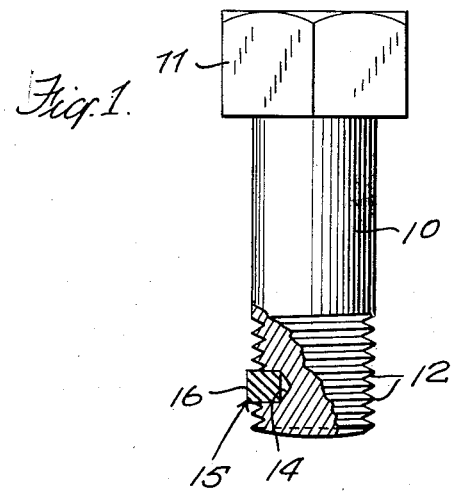
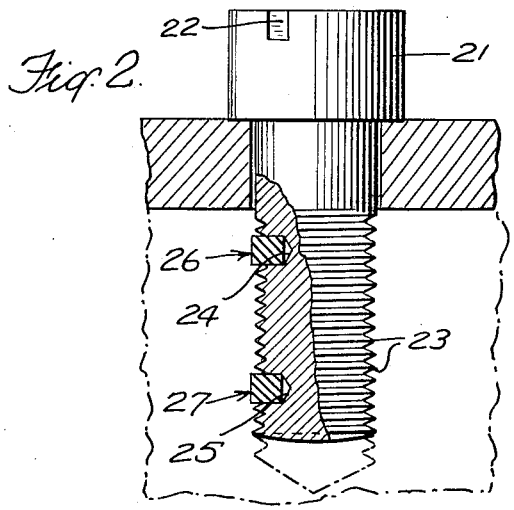
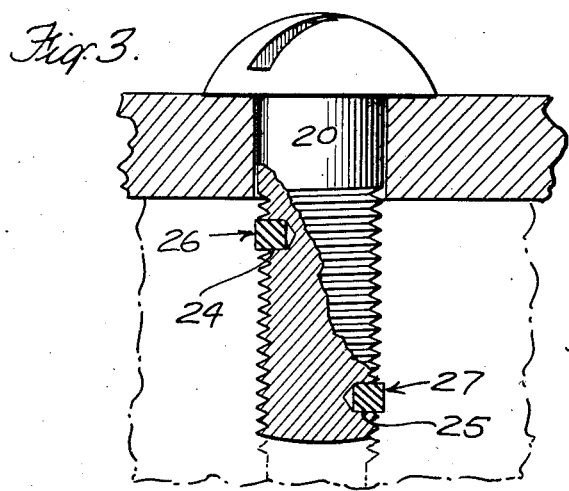
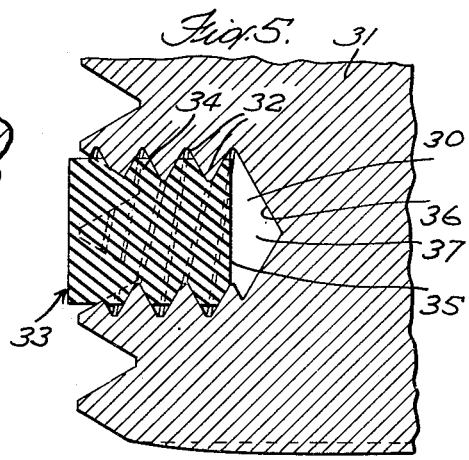
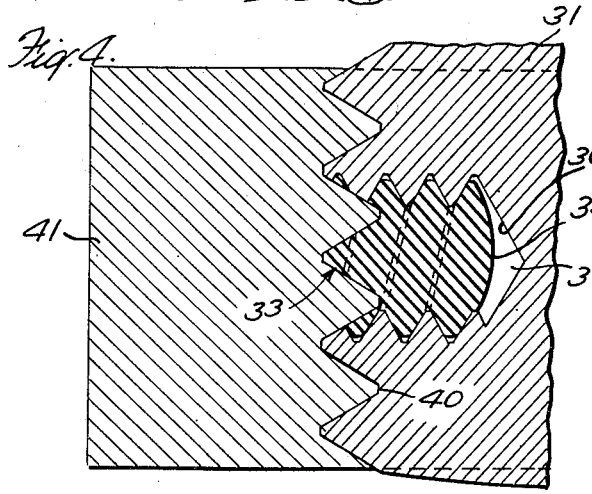
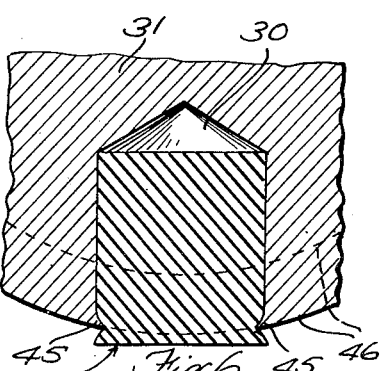
INVENTOR
LEE N. BRUTUS
BY
ATTORNEY Patented Aug. 29, 1950

2,520,121

UNITED STATES PATENT OFFICE 2,520,121

LOCK SCREW OR THE LIKE

Lee N. Brutus, Los Angeles, Calif.

Application June 27, 1947, Serial No. 757,563

5 Claims. (Cl. 151—7)

This invention relates to elements having external machine screw threads thereon such as machine screws, bolts, studs, threaded rods, or the like; and has for an object to provide novel and improved lock means to prevent the element from turning.

Another object is to provide a locking device of the type above indicated which retains its effectiveness after long continued or repeated use.

Another object is to provide a locking device of the above type which does not materially weaken the threaded element.

Various other objects and advantages will be apparent as the nature of the invention is more fully disclosed.

Although the novel features which are characteristic of this invention are pointed out more particularly in the claims, the nature of the invention will be better understood by referring to the following description, taken in connection with the accompanying drawing, in which a specific embodiment thereof has been set forth for purposes of illustration.

In the drawing:

Fig. 1 is a side elevation, partly in section, of a bolt showing my improved locking device;

Fig. 2 is a similar side elevation partly in section of a machine screw showing a modified form of locking device;

Fig. 3 is a sectional view similar to Fig. 2 showing a further modified form of locking device;

Fig. 4 is an enlarged detail view showing one means for locking the insert to the threaded shank;

Fig. 5 is an enlarged detail view similar to Fig. 4 showing the insert in locking engagement with the threads of the external member; and Fig. 6 is an enlarged detail view showing a further means of locking the insert in the threaded shank.

In accordance with the present invention, I provide a small plug of a material which is capable of being deformed without taking a permanent set and which tends to return to its original shape gradually as distinguished from rubber like compositions which return to their original shape as soon as the deforming pressure is removed. This plug is inserted in one side of the threaded shank in a position to bear against the internal thread of the external member. The plug has the characteristic of locking the shank against turning due to the friction produced by the plug itself against the internal threads and also by the lateral displacement of the shank in the external thread due to the pressure exerted by the plug on one side of the threaded shank.

I have found that nylon is particularly suited for this purpose. Nylon has the property of tending to return to its original shape after being deformed. Hence it does not take a permanent set and may be repeatedly reused. The external thread is pressed rather than cut into the surface of the nylon plug by the engaged thread and the tendency of the nylon plug to return to its original shape maintains a pressure against the engaged thread which produces a permanent locking effect. Such a locking device is effective after many repeated uses inasmuch as the surface of the plug returns to its original shape after each use.

Referring to the drawings more in detail, the invention is shown in Fig. 1 as applied to a bolt comprising a shank 10 and a head 11. The shank 10 is threaded throughout at least a portion of its length with a machine screw thread 12 which is adapted to enter a tapped hole in a machine part or to receive a nut.

At one side, near the end of the threaded portion of the shank 10, a small recess 14 is drilled through the thread 12 into the shank. The recess 14 preferably terminates short of the axis of the shank so as to remove as small an amount of metal as possible. Within this recess a plug 15 of nylon or the like, is secured. The plug 15 has a smooth outer surface 16 which is preferably flush with the top of the thread 12 or may extend slightly beyond the top of said thread, but in any event lies above the bottom of the thread so as to be deformed when secured into the outer member.

In Fig. 2 the invention is shown as applied to a machine screw comprising a shank 20 having a head 21 provided with a slot 22 to receive a screw driver, or the like. The head may, however, be of any type or the shank may be threaded at both ends as in a stud in the form shown. The shank 20 is threaded throughout a substantial portion of its length by a machine screw thread 23. In this embodiment a plurality of recesses 24 and 25 are drilled through the threads 23 on one side of the shank 20 near the upper and lower limits of the thread respectively. These recesses 24 and 25 carry plugs 26 and 27 respectively of nylon, or the like, similar to the plug 16 above referred to.

The embodiment shown in Fig. 3 is generally similar to that shown in Fig. 2 except that in Fig. 3 the recesses 24 and 25 are formed on opposite sides of the shank 20 instead of the same as in Fig. 2.

In any of these embodiments means must be provided for securing the plugs of nylon, or the like, in the recesses in the shank. The plug may, of course, be secured by a suitable adhesive although this means of securing the plug is usually unsatisfactory due to the difficulty of obtaining an adhesive which adheres satisfactorily both to nylon and to metal.

An alternative means for securing the nylon plug in the shank utilizes the tendency of the nylon to return gradually to its original shape. The Nylon may be obtained in the form of a rod which is cast in a size to fit tightly in the recess in the threaded shank, or may be of a diameter which is slightly oversize with respect to the shank recess. To facilitate insertion of the plug in the recess, the end of the nylon rod may be temporarily reduced in diameter by suitable means as by applying external compression, by extrusion through a die, or by rolling the end of the rod between pressure plates. Due to the gradual return of the rod, the reduced end may be inserted in the shank recess and cut at the level of the thread to form the plug insert as shown in Figs. 1 to 3 before the stock has had time to expand. After expansion, however, the plug becomes firmly secured to the shank.

A further means for securing the nylon plug to the shank is shown in Figs. 4 and 5. In this embodiment the recess 30 in the shank 31 is tapped with an internal thread 32. The nylon plug 33 which is formed of a diameter larger than the internal diameter of the thread 32 is screwed or twisted to insert the same in the recess 30, thereby causing the external surface of the plug 33 to flow into the threads 34 for securely locking the plug 33 in place. The plug 33 is preferably formed so that its inner end 35 terminates short of the bottom end 36 of the recess 30 so as to leave an expansion space 37.

When this shank is placed in an internally threaded member as shown in Fig. 5, the internal thread 40 of the external member 41 compresses the top surface of the plug 33 to cause the same to conform to the shape of the threads 40 and in so doing displaces the inner end 35 of the plug into the expansion space 37. The air pressure thus built up in the space 37, the resilience of the plug 33, and the natural tendency of the plug 33 to return to its initial shape causes the plug to exert a substantial pressure upon the threads 40 of the external member 41 which pressure is maintained throughout the period of use of the element.

A further means for securing the nylon plug in the shank is shown in Fig. 6. In this embodiment the plug 33 is inserted in the recess 30 of the shank 31 either by rolling or pressing as above pointed out, and the ends 45 of the thread 46 on the shank 31 are upset to form fingers which extend into and compress the plug 33 to secure the same in place. This upsetting of the ends 45 of the thread may be effected after the plug has been inserted in the shank.

In the embodiment shown in Fig. 1, the shank 10 is secured to the outer nut or other threaded element by lateral displacement between the internal and external threads produced by the pressure of the plug 15, and also by angular displacement of the axis of the shank. In Fig. 2 a lateral displacement of the entire shank 20 is produced which increases the friction of the mating threads on the side of the shank opposite the plugs 26 and 27.

The operation of the form of Fig. 3 is similar to that of Fig. 2 except that the lateral displacement produced by the plugs 26 and 27 in Fig. 3 causes the axis of the shank 20 to tilt with respect to the axis of the tapped hole. This same effect would also be produced by the use of a single plug 27 at the lower end of the shank.

It is obvious that the invention applies to any member having an externally threaded shank which is adapted to engage a corresponding internal thread of a mating member and that the terms used herein are to be interpreted accordingly.

Although specific embodiments of the invention have been shown and described for purposes of illustration, it is to be understood that the invention is capable of various uses and that changes and modifications may be made therein as will be readily apparent to a person skilled in the art. The invention is only to be limited in accordance with the scope of the following claims.

What is claimed is:

1. A fastener comprising a first element having an integral screw-threaded portion adapted to engage a similar screw-threaded portion of a second element, said first portion having a recess in one side only thereof having a cylindrical side wall and a closed bottom wall and extending into said portion through the threads thereof, and a plug of a deformable material having the property of not acquiring a permanent set but of returning gradually to its original shape after being deformed, said plug being secured in said recess with its top surface extending above the bottom of said threads so as to be deformed by the engaging thread of said second element for exerting locking pressure thereon, the bottom wall of said recess and the bottom of said plug having engaging portions forming a stop to limit the inward movement of said plug during assembly and having other portions spaced to form an expansion space adapted to receive the bottom of said plug when the latter is deformed by said engaging thread, the top surface of said plug being completely covered by said engaging thread when said elements are in use.

2. A fastener comprising a first element having an integral externally screw-threaded shank adapted to engage a similar internally screw-threaded portion of a second element, said shank having a recess in one side only thereof having a cylindrical side wall and a closed bottom wall and extending into said shank through the threads thereof, and a plug of a deformable material having the property of not acquiring a permanent set, but of returning gradually to its original shape after being deformed, said plug being secured in said recess with its top surface extending above the bottom of said threads so as to be deformed by engagement with the internal thread of said second element for exerting locking pressure thereon, the bottom wall of said recess and the bottom of said plug having engaging portions forming a stop to limit the inward movement of said plug during assembly and having other portions spaced to form an expansion space adapted to receive the bottom of said plug when the latter is deformed by said external thread, the top of said plug being completely covered by said internal thread when said elements are in use.

3. A fastener comprising a first element having an integral screw-threaded portion adapted to engage a similar screw-threaded portion of a second element, said first portion having a recess in one side only thereof having a cylindrical side wall and a closed bottom wall and extending into said portion through the threads, and a plug of a deformable material having the property of not acquiring a permanent set but of returning gradually to its original shape after being deformed, said plug being normally of a diameter larger than said recess and being secured in said recess under compression with its top surface extending above the bottom of said threads so as to be deformed by the engaging thread of said second element for exerting locking pressure thereon, the bottom wall of said recess and the bottom of said plug having engaging portions forming a stop to limit the inward movement of said plug during assembly and having other portions spaced to form an expansion space adapted to receive the bottom of said plug when the latter is deformed by said engaging thread, the top surface of said plug being completely covered by said engaging thread when said elements are in use.

4. A fastener comprising a first element having an integral externally screw-threaded shank adapted to engage a similar internally screw-threaded portion of a second element, said shank having a recess in one side only thereof having a cylindrical side wall and a closed bottom wall and extending into said shank through the threads thereof, and a plug of a deformable material having the property of not acquiring a permanent set, but of returning gradually to its original shape after being deformed, said plug being normally of a diameter larger than said recess and being secured in said recess under compression with its top surface extending above the bottom of said threads so as to be deformed by engagement with the internal thread of said second element for exerting locking pressure thereon, the bottom wall of said recess and the bottom of said plug having engaging portions forming a stop to limit the inward movement of said plug during assembly and having other portions spaced to form an expansion space adapted to receive the bottom of said plug when the latter is deformed by said external thread, the top of said plug being completely covered by said internal thread when said elements are in use.

5. A locking device, as set forth in claim 1, in which said plug is composed of nylon.

LEE N. BRUTUS.

REFERENCES CITED

The following references are of record in the file of this patent:

UNITED STATES PATENTS

| Number | Name | Date |
|---|---|---|
| 1,808,047 | Littleton | June 2, 1931 |
| 1,913,198 | Geyer | June 6, 1933 |
| 2,421,105 | Warren | May 27, 1947 |

FOREIGN PATENTS

| Number | Country | Date |
|---|---|---|
| 496,638 | Great Britain | Dec. 2, 1938 |